United States Patent

Prydtz et al.

Patent Number: 5,664,660
Date of Patent: Sep. 9, 1997

[54] SORTER CONVEYOR

[75] Inventors: Ole Prydtz, Hjortshoej; Ralph Kofoed, Hornslet, both of Denmark

[73] Assignee: Kosan Crisplant A/S, Aarhus, Denmark

[21] Appl. No.: 285,422

[22] Filed: Aug. 3, 1994

Related U.S. Application Data

[63] Continuation of Ser. No. 155,232, Nov. 22, 1993, abandoned, which is a continuation of Ser. No. 994,292, Dec. 21, 1992, abandoned, which is a continuation of Ser. No. 752,664, Aug. 26, 1991, abandoned.

[30] Foreign Application Priority Data

Feb. 24, 1989 [DK] Denmark .................. 0860/89

[51] Int. Cl.$^6$ .................. B65G 47/34
[52] U.S. Cl. .................. 198/370.04; 198/370.03
[58] Field of Search .................. 198/369.3, 370.01, 198/370.03, 370.04

[56] References Cited

U.S. PATENT DOCUMENTS

| | | |
|---|---|---|
| 3,150,763 | 9/1964 | Immesberger . |
| 3,265,190 | 8/1966 | Boehm . |
| 3,426,887 | 2/1969 | Ward et al. . |
| 3,662,874 | 5/1972 | Muller . |
| 3,848,928 | 11/1974 | Leibrick et al. . |
| 4,635,785 | 1/1987 | Prydtz . |
| 4,726,464 | 2/1988 | Lanziani . |
| 4,792,036 | 12/1988 | Heidelberg . |
| 4,846,335 | 7/1989 | Hastepp . |
| 4,984,674 | 1/1991 | Fostenberry . |
| 5,054,601 | 10/1991 | Sjogfen et al. . |
| 5,167,292 | 12/1992 | Harrison et al. . |
| 5,433,311 | 7/1995 | Bonnet .................. 198/370.04 |

FOREIGN PATENT DOCUMENTS

| | | |
|---|---|---|
| A1173399 | 3/1986 | European Pat. Off. . |
| 2905313 | 8/1979 | Germany . |
| 0151274 | 11/1979 | Japan . |
| 0175802 | 6/1961 | Sweden . |
| 0573418 | 9/1977 | U.S.S.R. . |
| 1247333 | 7/1986 | U.S.S.R. . |
| 1305103 | 4/1987 | U.S.S.R. . |
| A2124573 | 2/1984 | United Kingdom . |

*Primary Examiner*—James R. Bidwell
*Attorney, Agent, or Firm*—Antonelli, Terry, Stout & Kraus, LLP.

[57] ABSTRACT

A sorter conveyor having laterally tiltable transport trays, instead of comprising a conventional transport chain driven by a driving station, in which a driving wheel or worm cooperates with the chain links, these being advanced arranged with guiding rails along a small mutual spacing and carrying both the transport trays and the tilt mechanisms associated therewith, which conventional arrangement causes considerable problems with respect to tolerances for both the longitudinal pitch of the chain links and the mounting of the guiding rails, comprises carts that are advanced along mutually widely spaced guiding rails (2), whereby the tolerance demands on the latter are reduced considerably; the carts are advanced by way of stationary linear motors (26), which renders any tolerance demands on the longitudinal pitch of the tray units entirely superfluous. Also the tilting mechanisms may be given a very simple design.

13 Claims, 2 Drawing Sheets

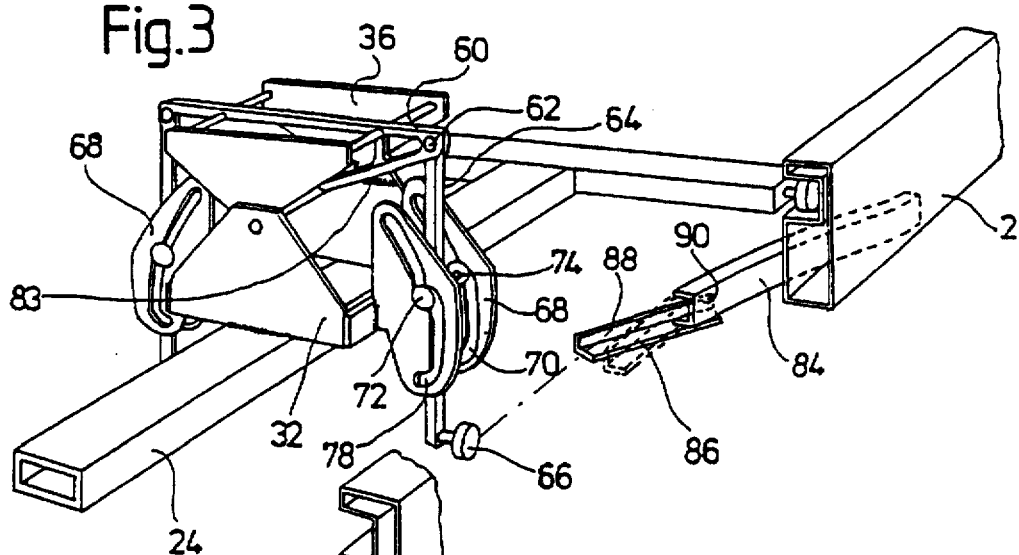
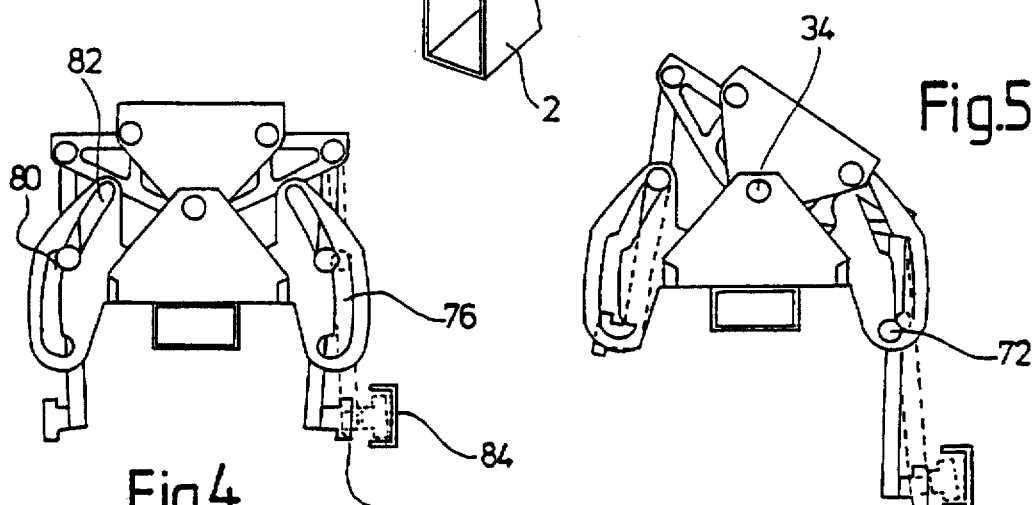
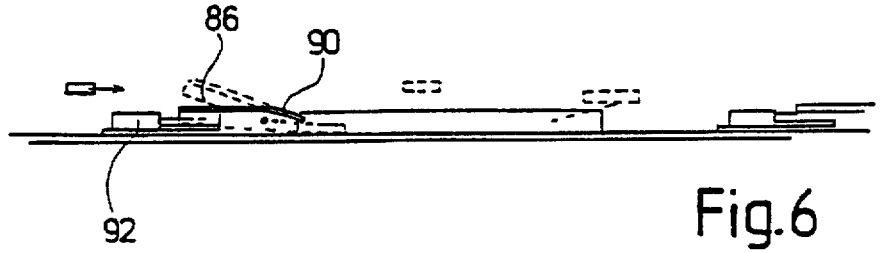
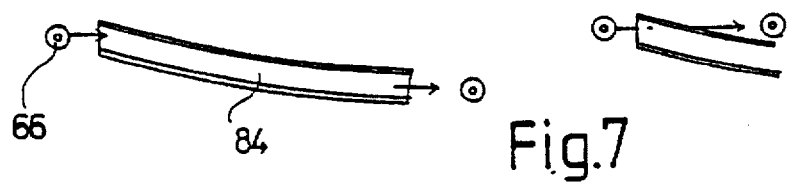

SORTER CONVEYOR

This is a continuation of application Ser. No. 08/155,232 filed Nov. 22, 1993 which is in turn a continuation of application. Ser. No. No. 07/994,292, filed Dec. 21, 1992 which in turn is a continuation of application Ser. No. 07/752,664 filed Aug. 26, 1991, each of which prior applications is now abandoned.

BACKGROUND OF THE INVENTION

The present invention relates to a sorting conveyor including an annular row of laterally tiltable carrier platforms, which, on movable supports, are conveyed past a loading station, in which articles to be sorted are placed on the carrier platforms or so-called trays, and past a row of unloading or receiving stations, in which the trays are actuated selectively for tilting off and unloading the articles.

Conventional trays are driven by way of a driving station cooperating with a chain, to which the supports of the trays being secured, to a very heavy chain, the links of which are fitted with protruding guiding rollers that cooperate with longitudinal guiding rails, such that it is the chain itself which constitutes a stabilized base for the tray supports. This arrangement requires a guiding system made with very fine tolerances if unfortunate jammings and shakings should be avoided, moreover, the chain itself should be made with fine tolerances for a current, untroubled cooperation with the driving station. There are extra demands on the chain construction if the chain is to move through both horizontal and vertical curves, because the chain links should then be mutually movable in more directions while maintaining narrow tolerances. On the other hand it will then be possible, by for example a tachometer sensing at a single place of the conveyor path, to keep control with the exact positionings of all the trays in the system, such that the actuator means for the tilting of the trays in the single unloading stations can be activated by the passage of just the respective relevant trays.

SUMMARY OF THE INVENTION

It is the purpose of the invention to provide a new construction of a sorting conveyor of the type described above by which several important advantages will be obtainable.

A main aspect of the invention is that the principle of effecting the drive of the conveyor by cooperation between a local driving station and a driven conveyor chain is eliminated, an instead the single tray elements with associated supports form cart units that are driven along a carrier chassis based on the use of linear motors evenly distributed along the chassis, with the single cart units being provided with marker means that are selectively detectable in the unloading stations.

This concept offers a number of important advantages. The single units may well be said to constitute links in a chain, but the units, as carts, may cooperate with a guiding chassis, which can have widely separated guiding rails and, for that reason, can be designed without the fine tolerances as required for conveyor chains, if they shall be advanced without jamming and without shakings or undue wear. Also the carts themselves can be built with rather coarse tolerances, particularly with respect to their length dimension; It is a characteristic of a chain driven by a driving station that the chain should have a constant and rather accurate pitch, but in connection with the invention it is without any operative significance whether the carts are even approximately of uniform lengths. In principle the carts need not even be intercoupled, when only the linear motor equipment is suitably widespread to be able to steadily serve the carts. However, it is very simple to provide for an intercoupling between the carts, since a both simple and very suitable coupling can be constituted by a central ball head connection, which will enable the coupled carts to carry out mutual turns in all possible directions. This is important when driving through horizontal and/or vertical curves, and it should be under emphasized that with intercoupled carts each cart will have to be provided with driving rollers only at its front or rear end, while the opposite end can just be centrally turnably connected with the roller carrying end of the cart to which it is coupled. Hereby the carts may also pass through twisted portions of the chassis, e.g. when the carts are moved into a laterally inclined position for running through horizontal curves, this making an operation at quite high speed possible; However the trays may be tilted into a suitably inclined position along such curves, without the carts having to be tilted.

The carts will be very easy to remove one by one should they need to be replaced, and it will be possible to make use of carts with different lengths.

The term "linear motor" should be understood in a wide sense, but typically the motors will be of the travelling field type, which is usually designated by this term. Preferably use is made of a plurality of such motors with an even distribution along the conveyor track, and of course the carts should be provided with parts such as longitudinally extending rail portions of aluminium for cooperation with the motors. With the use of carts that are not coupled together the motors should be located with sufficiently small spacing to ensure that each cart train will steadily be in driving connection with at least one motor. It may well be presumed that the moved carts due to their inertia will be able to move a long distance between two motors or motor areas, but at each start of the system, preferably, all cart trains should be able to start no matter in which positions they have been stopped.

The invention implies significant consequences for the manner in which the entire system can be controlled, but that is dealt with in more detail in a parallel patent application.

BRIEF DESCRIPTION OF THE DRAWINGS

In the following the invention is explained in more detail with reference to the drawing, in which:

FIG. 3–5 are different views of an associated tilting mechanism, and

FIGS. 6–7 are top and side views, respectively, of an actuation arrangement for the tilting mechanism.

DETAILED DESCRIPTION

Figure 1:
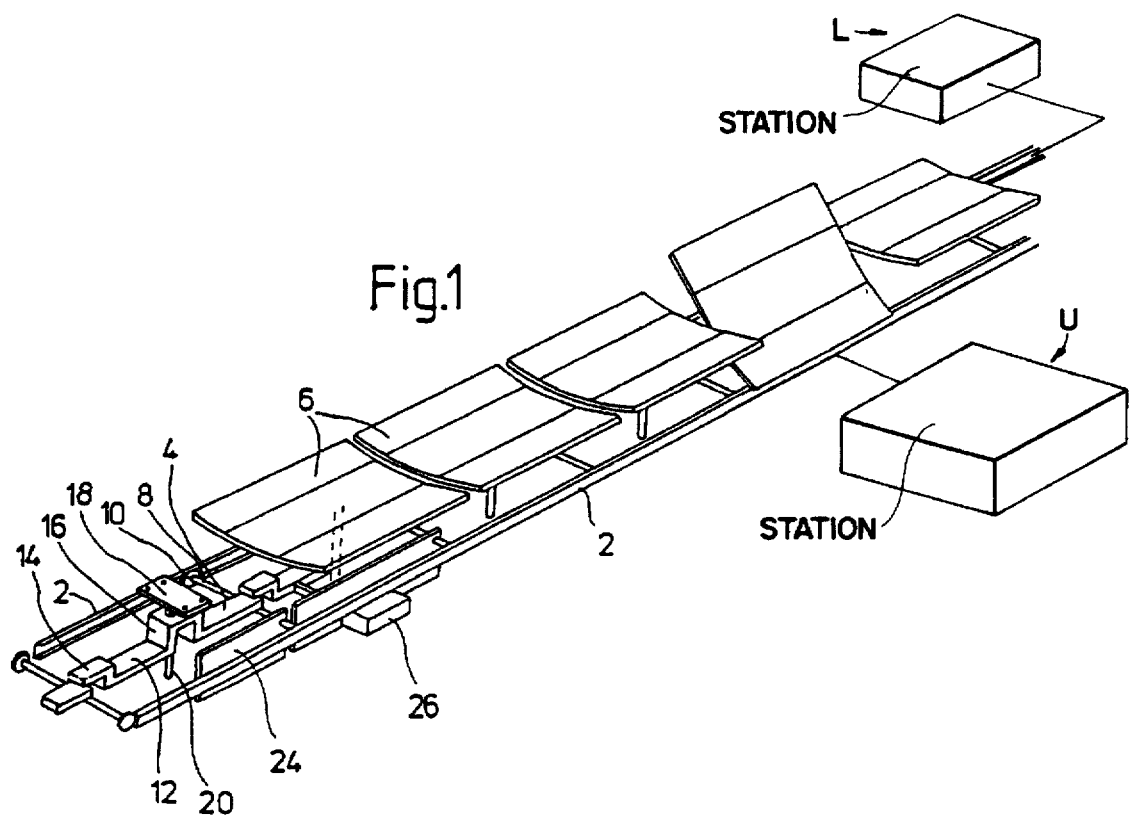
FIG. 1 is a perspective partial view of a sorter conveyor according to the invention.

The conveyor shown in FIG. 1 has a rigid chassis with two parallel guiding rails 2 mounted with a substantial mutual spacing, e.g. by 60 cm. Between the rails is arranged a row of carts 4 each having an upper tray 6. Each cart includes of a traverse 8 having outer driving wheels 10, which can roll in substantially C-profiled rails 2, and a carrier portion 12 that projects forwardly or rearwardly from the traverse 8. The carrier portion 12, at its opposite end is turnably coupled together with the following or the preceding cart. On the carrier portion 12 is provided a top structure 16 tiltably supporting the tray 6, which is secured to a carrier plate 18 at the top of a depending rod 20 fastened in a pivot bearing to the structure 16. Hereby the trays 6 may be tilted by a suitable lateral displacing of the lower ends of the rods 20. It should be mentioned, however, that this arrangement is shown only as an illustrative example, as it will have certain drawbacks in certain applications of the conveyor.

A longitudinally extending aluminum plate 24', cooperable with linear motors 26, is provided on the transverse 8 with the linear motors 26 being arranged locally along the guiding rails 2. Hereby the carts or the train of carts can be advanced without the use of any other form of fixed driving station, i.e. the carts should not be designed with accurately positioned parts for mechanical engagement with driving means of such a station.

Figure 2:
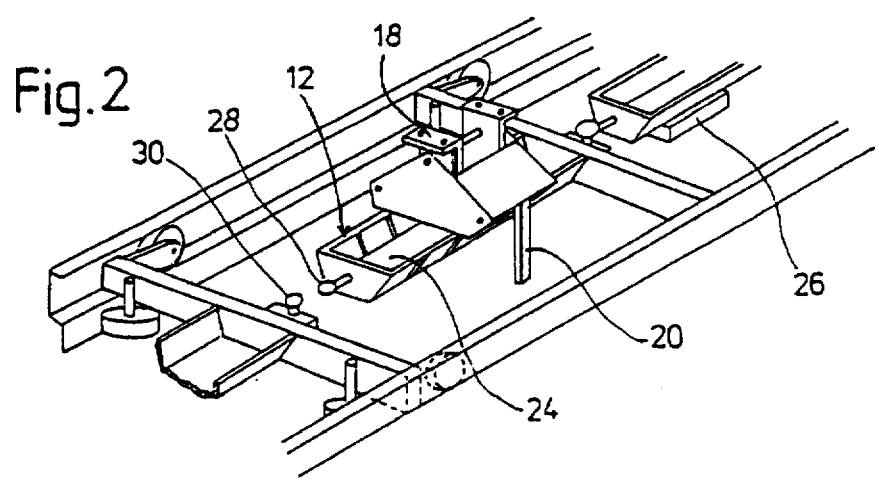
FIG. 2 is a perspective view of an embodiment of a cart in the sorter a conveyor of FIG. 1.

In FIG. 2 is shown a more suitable embodiment, in which an aluminium plate 24 is mounted as a horizontal bottom plate underneath the central carrier portion 12, such that the linear motors 26 may effect driving centrally on the carts. The actuator rods 20 cannot then be depending underneath the middle area of the carts, but they can be placed pairwise adjacent respective opposite sides of the carts for tilting actuation of the trays 6 to one side and the other, respectively. FIG. 2 also shows in more detail that the free end of the central carrier portion is provided with a coupling head 28 to be coupled together with a ball head 30 of the neighboring cart.

FIGS. 3–5 show a preferred design of the tilting mechanism. On a rigid bracket 32 is mounted a single tilting body 36 having at its top a crosswise extending arm 60, which is at either end provided with a pivot bearing 62 carrying a depending pivot arm 64, which at its lower end is provided with a laterally projecting cam follower roller 66. At either side of the bracket is mounted a pair of parallel plates 68 each provided with guiding tracks 70 cooperating with rollers 72 on a cross shaft pin 74 approximately midway on the arm 64. Each of the tracks 70 has a lower portion 76 shaped with a lowermost, inwardly directed track portion 78 and with an uppermost, correspondingly inwardly directed track portion 80, which continues further upwardly in an upper track portion 82.

As shown in FIG. 3 and 4 the depending pivot arms 64 assume a normal position with the rollers 72 located adjacent to the innermost end of the intermediary track portions 80, whereby they are held in an associated, slightly inwardly inclined position by the action of a drawspring 83 interposed between the arms 64. The spring 83 permanently seeks to swing the lower ends of the arms inwardly. In these positions, the rollers 72 cannot be moved downwardly, i.e. the tilting mechanism will be locked against tilting to either side.

An actual tilting will be enabled by a selected lower cam follower roller 66 (FIG. 4), FIG. 4 being pulled outwardly and thereafter downwardly as shown in FIG. 5. When pulled outwardly the rollers 72, by the associated outward tilting of the arm 64, will be moved outwardly in the track portions 80 into a position adjacent the upper end of the lower track portions 76, such that these will thereafter, when guided down along the track portions 76, allow the arm 64 to be pulled downwardly for effecting tilting of the tilting body 36 and its associated, non-illustrated tray. During this, the rollers 72 on the opposite arm 64 will be moved upwardly through the upper track portions 82, thereby this arm can be held swung inwardly in a roughly unchanged angular position, and it will thus be ensured that its rollers 72 will be returned safely to the initial position by the following swinging down. In the right hand side—the arm 64 will be forced to swing inwardly during the very final phase of the drawing down, viz. by introduction of the rollers 72 into the lower track end 78, this being shown in full lines in FIG. 7. Besides, all this will not normally be a question of a pulling down, but rather of a pressing down, because the conveyor tray and the load resting thereon will get the common point of gravity moved outwardly by the tilting, whereby the tilting will be positively supported.

For the pulling down of the roller 66 the illustrated fixed inclined rail 84 at the inside of the chassis bed 2 is used. According to FIG. 4, however, the roller 66 in its normal position will be located somewhat inside of the rail 84, such that normally a free passage of the units at the selected unloading station (FIG. 1) will be ensured, and it will be understood that an actuation of the unloading station it will require the outward tilting of the arm 64. For achieving that result there is mounted adjacent the foremost upper end of the rail 84, an L-profiled rail portion 86 having an inner upstanding flange 88, and—as shown in dotted lines in FIG. 3—assuming a normal position in straight continuation of the rail 84 and thus outside the path of movement of the roller 66. The L-profiled member 86 is pivotally connected with the front end of the lower flange of the rail 84, such that it is pivotable into the position shown in full lines in FIG. 3, in which its front end is located inside the path of movement of the roller area 66, such that this roller when passing the area, will hit contact the upstanding flange 88 and thus be forced to move into contact with the rail 84. The L-profiled member 86 is prolonged at the other side of its pivot connection with the rail 84, whereby the upstanding flange portion at this end will be swung closely towards the vertical wall of the rail 84. Thus, this wall may even be utilized as a pivot stop for the L-profiled. When the roller 66 has been guided to the end of the rail 84, the roller, during its further advancing, will abut against the thus swung-out end portion 90 of the flange portion 88 of the L-member, and since the pivot connection is located near the outer edge of the bottom flange of the substantially C-shaped fail 84, the abutment will cause the L-profiled member 86, by its engagement with the roller 66, to swing back into its initial position by the passage of the roller through the discussed area.

Thereafter, the roller 66 will be pulled first somewhat downwardly by its cooperation with the top flange of the inclined rail 84, whereby the rollers 72 on the arm 64 will be moved downwardly in the track portions 76 such that the roller 66 will thereafter be blocked against leaving its engagement with the rail 84, and thereafter, the roller is drawn further downwardly during its following passage along the rail 84. The system is designed such that the rail 84 at its lower end stops just where it has operated to pull the roller 66 down to a level (FIG. 5) in which the rollers 72 get the opportunity to retreat into the lower track ends 78 by the action of the spring 83, whereby the roller 66 will be pulled away from its engagement with the rail 84.

In the initial phase it will be the upper flange of the rail 84 that will be active for the pulling down of the arm 64, but in the following it will rather be the lower flange that is effective for a guiding down of the roller 66, namely upon the tilting having reached the point where the point of gravity of the tilted mass has been displaced considerably to the outside of the tilting axis 34. It will be appreciated that the tilting movement is thus under full control right from the beginning to the end thereof, this being a remarkable advantage.

It is an important condition, of course, that the actuation rollers 66 can freely pass the discussed means for guiding the rollers downwardly when passing the non-actuated unloading stations, but this is easily achievable by the rollers 66 in their normal positions (FIG. 4) not even projecting out to the area in which the rail 84 is located.

For the required actuation pivoting of the L-shaped rail member 86 any suitable mechanism can be used, e.g. a magnet 92 as shown in FIG. 6. It is sufficient that magnet 92, by a brief actuation impulse, swings to the L-shaped member 86 outwardly. Thereafter the magnet need not effect any holding action on the swung out L-shaped rail member 86; this member will be self supporting during the outward movement of the roller 66, and as mentioned it will swing back by a purely mechanical influence from the roller 66 itself, i.e. the actuation member used has no other effect than bringing the light L-shaped rail member 86 into its actuated position, which can be done very fast and with a minimum of energy consumption. For extra security and ease of actuation, however, it is preferred to let the L-shaped rail member 86 be spring biased for swinging into an actuated position in response to a locking pawl being released by the magnet 92: by the following swinging back of the L-shaped rail member 86 this 86 will get into a snap lock engagement with the locking pawl.

In the left hand side of FIG. 7 is illustrated an actuated run-through of the roller 66, while in the right hand side a non-actuated run-through is illustrated.

As mentioned, the actuated units will be locked in their tilted out positions by the action of the spring 83, and of course they should be brought right again before they are returned to the loading station L. However, such a righting will be easy to effect, viz. by means of rigid guiding or cam means mounted in front of the loading station so as to be able to pull out the rollers 66 from their respective lower positions (FIG. 5) and to thereafter guide the rollers upwardly into their normal positions (FIG. 4), in which they are self locking by the action of the spring 83.

It should be mentioned that the use of the loose tray carts or separate cart trains with a number of trays will involve the possibility of providing sorter systems, in which, with the use of rail switches, it is possible to operate on more rail sections coupled in parallel, whereby according to the requirements branchings can be provided both in the horizontal and the vertical plane.

It is a special possibility that on each cart chassis or on just some of them, for example, two or more trays 6 be arranged in a series. The carts should carry suitable identification means that are detectable by their passage of the unloading stations.

We claim:

1. A sorter conveyor comprising a conveyor chassis, a row of supports supporting laterally tiltable carrier trays, movable along said conveyor chassis past a loading station to receive articles to be sorted and past a row of unloading or receiving stations at which the trays are selectively actuated so as to tilt and unload the articles, wherein said supports are fashioned as cart units having guiding members engaging with the conveyor chassis with a substantial mutual spacing, and wherein a plurality of discrete driving parts are provided on respective ones of said cart units said driving parts being elongated in an advancing direction of the cart units and a plurality of linear motors mounted in fixed positions relative to said conveyor chassis, said driving parts of said cart units being adapted for operative cooperation with said linear motors for moving said cart units with tiltable trays along said conveyor chassis, and wherein tray actuator arms are mounted on both sides of each cart unit for effecting tilting of the carrier trays to one side and the other, respectively, said tray actuator arms each having a track follower roller thereon by which said arms can be actuated against cam rails mounted on said chassis for tilting said trays.

2. A conveyor according to claim 1, wherein the cart units are single axle carts having means for enabling a coupling of the respective cart units together.

3. A conveyor according to claim 1, wherein driving parts are placed longitudinally underneath a central area of the respective cart units, and wherein said tray actuator arms are mounted depending from the cart units at both sides of the driving parts for effecting tilting of the carrier trays to one side and the other, respectively.

4. A conveyor according to claim 3, wherein each actuator arm is mounted laterally tiltably and has an projecting arm portion having a cam at a free end thereof, and wherein said cam cooperates with a track in a crosswise arranged plate member projecting from the tray, said track having a configuration such that it is operable to effect a tilting of the plate member when the arm portion is pivoted.

5. A conveyor according to claim 4, wherein the cam, in a normal position with the carrier tray in a transportation position thereof, is located in front of an engagement portion of the plate member so as to prevent a tilting of the latter, and wherein the cam, by an initial actuation of the associated actuator arm is swung away from the engagement portion into a position in an initial operative engagement with said track.

6. A conveyor according to claim 3, wherein said cam rails can be selectively actuated, said track follower rollers provided on the actuator arms are operable to be brought into engagement with said selectively actuated cam rails at the respective unloading stations, the unloading stations, at inlet ends thereof, having a rail switch element which is adapted to be operated to pivot into the path of the movement of the track follower roller for displacing the latter into engagement with the cam rail, and wherein the rail switch element at the other side of pivot axis thereof has a prolonged end portion, which, in connection with the pivoting of the rail switch element, is pivoted into the path of movement of the track follower roller along the cam rail in such a manner that by the following passage of the roller past that area the roller will hit the swung-in end portion and thereby cause it to swing out for return swinging of the swung out main portion of the rail switch element.

7. A conveyor according to claim 3, wherein said cam rails can be selectively actuated, said track follower rollers on the actuator arms are operable to be brought into engagement with said selectively actuated cam rails at respective unloading stations for producing a relative movement of the actuator arms so as to tilt the associated carrier tray the cam rails are provided as two sided guides for the actuation movement of the track follower roller, and wherein the actuator arms are guided in guide means of the individual cart units in such a manner that the actuator arms, when the rollers leave rear ends of the rigidly mounted cam rails, are forced to be swung passively into final positions, in which further paths of movement of the follower rollers are entirely separated from the location of the cam rails, by causing the actuator arms to be pivoted so as to move the track follower rollers in a direction substantially perpendicular to the direction in which the cam rails affect the track follower rails for effecting the active tilting movement of the carrier trays.

8. A conveyor according to claim 6 or 7, wherein each actuator arm is crosswise pivotally mounted and has a lower track follower roller that can be brought into operative engagement with a guiding rail mounted in an inclined position on the conveyor chassis for effecting a pulling down of the roller and thus an associated tilting out of the tilted position, and wherein the actuator arms are spring biased to pivot and cooperate with guideway means in a manner such that in normal positions of the actuator arms, the actuator arms having guiding pins or rollers situated in horizontal guideway tacks so as to be blocked against being pulled in a downward direction, said tracks at outer ends thereof continuing into downwardly directed track portions which, upon an outward pivoting of the relevant actuator arm, will allow a downwardly directed movement of the actuator arm, said track at its lower end, having an inwardly directed locking track portion, into which the guiding pins or roller are introduceable by an action of the said spring means for effecting an associated inwardly directed pivoting of the track follower roller of the actuator arm from the position in which it is located in a plane of engagement with the cam rail.

9. A sorter conveyor comprising a conveyor chassis, a row of supports supporting laterally tiltable carrier trays and movable along said conveyor chassis past a loading station wherein said trays receive articles to be sorted and past a row of unloading or receiving stations at which the trays are selectively actuated so as to tilt and unload the articles, said carrier trays being operatively connected with cam follower means selectively engageable with cam rail portions at the respective unloading stations to the effect that the cam follower means are caused to be displaced transversely of their moving direction and thereby serve to control and effect the operational tilting of the associated carrier tray, said cam rail portions of each unloading station comprising at their inlet end a rail switch element which is pivotable between an inoperative position, in which it is located spaced from the path of movement of said cam follower means, and an active position, in which a front end thereof is located in said movement path, such that when actuated the rail switch element will cause the cam follower means to be caught and transversely displaced into engagement with said cam rail portion to thereby effect the unloading tilting of the associated carrier tray, returning means being provided for returning the rail switch element into its inoperative position in response to the passage of said cam follower means, said returning means including that the rail switch element is arranged in such a pivotal manner that in being actuated its front end will be swung out into a position corresponding with the path of movement of the cam follower means, while its rear end portion, at the opposite side of the pivot axis thereof, will swing into the deviated path of movement of the cam follower means, such that at the end of the movement of the cam follower means along the rail switch element the downstream end thereof will be hit by the cam follower means so as to thereby be return pivoted into its inoperative position.

10. A conveyor according to claim 9, wherein said supports are fashioned as cart units having guiding members engaging with the conveyor chassis with a substantial material spacing, and wherein said cart units are provided with driving parts which are elongated in an advancing direction of the cart units and a plurality of linear motors mounted in fixed positions relative to said conveyor chassis, said driving parts of said cart units being adapted for operative cooperation with said linear motors for moving said cart units with tiltable trays along said conveyor chassis.

11. A conveyor according to claim 10, wherein the cart units are single axle carts having means for enabling a coupling of the respective cart units together.

12. A conveyor according to claim 10, wherein said driving parts are placed longitudinally underneath a central area of the respective cart units.

13. A conveyor according to claim 9, wherein said cam follower means includes tray actuator arms mounted laterally tiltable on both sides of each cart unit so as to depend therefrom for effecting tilting of the carrier trays to one side and the other, respectively, and track follower rollers on the tray actuator arms by which said arms can be actuated against said cam rail portions for tilting said trays.

* * * * *